UNITED STATES PATENT OFFICE.

ALFRED RINCKENBERGER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

STABLE DRY HYDROSULFITE MIXTURE.

No. 869,655.

Specification of Letters Patent.

Patented Oct. 29, 1907.

Application filed August 29, 1906. Serial No. 332,529.

*To all whom it may concern:*

Be it known that I, ALFRED RINCKENBERGER, doctor of philosophy and chemist, a subject of the German Emperor, residing at Ludwigshafen-on-the-Rhine, Germany, have invented new and useful Improvements in Stable Dry Hydrosulfite Mixture, of which the following is a specification.

In the specification of Letters Patent No. 756,759 is described the production of stable dry hydrosulfites by filtering off the hydrosulfite which has been precipitated from, or salted out of, its solution, then washing with a volatile liquid which is miscible with water, then removing, by evaporation in a vacuum, the washing liquid which clings to the hydrosulfite and then inclosing the hydrosulfite in an atmosphere of an inert gas. I have now discovered that a new composition of matter being a stable calcium hydrosulfite mixture can be produced if the calcium hydrosulfite (before, or simultaneously with, or after, being treated with a volatile liquid miscible with water) be suitably mixed with calcium oxid, or other oxid, or hydrated oxid, as hereinafter defined. The new composition of matter thus obtained possesses sufficient stability to satisfy practical requirements and does not require to be inclosed in an atmosphere of inert gas. It is a valuable reducing agent capable of very general application in the arts where reduction is to be effected. It can for instance be very well used in the indigo vat for reducing indigo.

My invention can be carried out for instance by washing the precipitated calcium hydrosulfite with a liquid which is miscible with water such for example as alcohol, and then stirring the paste with quicklime, or the like, as hereinafter explained. Or the precipitated calcium hydrosulfite, of course, after removal of uncombined water, can be first mixed with quicklime, or the like, and be afterwards washed with alcohol, or the like. Or the calcium hydrosulfite can be stirred directly with a mixture of alcohol and quicklime, or the equivalents. After removing the greater part of the alcohol, or the like, the product should be dried in vacuo, preferably at an elevated temperature. If desired, the calcium hydrosulfite, which has been washed with alcohol, or the like, can be dried and afterwards be mixed with quicklime, or the like. In all cases either quicklime, an oxid of other alkaline earth metals, or a dry alkali hydroxid, can be employed. The quantity of such oxid, whether hydrated, or not, to be added can be considerably varied, but it should not be less than ten (10) per cent. of the finished product, which is then of an exceptionally good stability.

The following example will serve to further illustrate the nature of my invention and how it can be carried into practical effect, but my invention is not confined to this example. Stir together eighty (80) liters of a sixteen (16) per cent. sodium hydrosulfite solution and seventy-five (75) liters of a twenty-nine (29) per cent. calcium chlorid solution; filter off the precipitate, wash with water, and then remove the water by washing with alcohol, then mix the alcoholic paste, so obtained, with about two (2) kilograms of quicklime. Filter off the greater part of the alcohol from the mass so obtained and then dry the whole *in vacuo*, preferably at a temperature of from about thirty (30), to about forty (40), degrees centigrade. The product possesses a high degree of purity and is very stable when kept in closed vessels.

Now what I claim is:

1. As a new composition of matter a dry stable mixture containing calcium hydrosulfite which is practically free from uncombined water and a hereinbefore defined metallic oxid.

2. As a new composition of matter a dry stable mixture containing calcium hydrosulfite which is practically free from uncombined water and quicklime.

3. The process of producing dry stable calcium hydrosulfite mixtures by washing precipitated calcium hydrosulfite with a volatile liquid which is miscible with water, then adding a hereinbefore defined oxid and then drying the whole *in vacuo*.

4. The process of producing dry stable calcium hydrosulfite mixtures by washing precipitated calcium hydrosulfite with alcohol, then adding quicklime and then drying the whole *in vacuo*.

In testimony whereof I have hereunto set my hand in the presence of two subscribing witnesses.

ALFRED RINCKENBERGER.

Witnesses:
H. W. HARRIS,
J. ALEC. LLOYD.